(12) United States Patent
Herbst

(10) Patent No.: US 7,713,505 B2
(45) Date of Patent: May 11, 2010

(54) XLI$_3$N$_2$ COMPOUNDS AND THEIR HYDRIDES AS HYDROGEN STORAGE MATERIALS

(75) Inventor: Jan F. Herbst, Grosse Pointe Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/758,049

(22) Filed: Jun. 5, 2007

(65) Prior Publication Data

US 2008/0305024 A1 Dec. 11, 2008

(51) Int. Cl.
*C01F 17/00* (2006.01)
*C01B 21/00* (2006.01)
*C01B 21/092* (2006.01)

(52) U.S. Cl. .................. 423/263; 423/351; 423/413

(58) Field of Classification Search .......... 423/351, 423/413, 263
See application file for complete search history.

(56) References Cited

U.S. PATENT DOCUMENTS

| | | | | |
|---|---|---|---|---|
| 5,888,669 | A * | 3/1999 | Thompson et al. | 429/231.95 |
| 6,946,112 | B2 * | 9/2005 | Chen et al. | 423/645 |
| 6,949,314 | B1 * | 9/2005 | Hossain | 429/231.4 |
| 7,341,703 | B2 * | 3/2008 | Pinkerton et al. | 423/413 |

OTHER PUBLICATIONS

Chen et al., "Hydrogen Storage in Metal-N-H Complexes," 2005, NUS, pp. 1-30.*
Purdy, "Indium(II1) Amides and Nitrides," 1994, Inorg. Chem., 33, pp. 282-286.*
Yamane et al, Reactivity of hydrogen and ternary nitrides containing lithium and 13 group elements,: 2005, Journal of Alloys and Compounds, 402, pp. L1-L3.*
U.S. Appl. No. 11/386,409, Jan F. Herbst.
A. Gudat, R. Kniep and A. Rabenau, Li3FeN2, A Ternary Nitride with . . . , Journal of the Less-Common Metals, 161 (1990) 31-36.
R. Niewa, D.A. Zherebtsov, S. Leoni, Li3[ScN2]: The First Nitridoscandate(III)-Tetrahedral Sc Coodination and Unusual Mx2 Framework, Chem. Eur. J. 2003, 9, 4255-4259.

* cited by examiner

*Primary Examiner*—Wayne Langel
*Assistant Examiner*—Brittany M Martinez
(74) *Attorney, Agent, or Firm*—Reising Ethington P.C.

(57) ABSTRACT

State-of-the-art electronic structure calculations provide the likelihood of the availability of YLi$_3$N$_2$, ZrLi$_3$N$_2$, NbLi$_3$N$_2$, MoLi$_3$N$_2$, TcLi$_3$N$_2$, RuLi$_3$N$_2$, RhLi$_3$N$_2$, GeLi$_3$N$_2$, InLi$_3$N$_2$, and SnLi$_3$N$_2$ as compounds for reaction with hydrogen under suitable conditions. Such calculations also provide the likelihood of the availability of YLi$_3$N$_2$H$_n$, ZrLi$_3$N$_2$H$_n$, NbLi$_3$N$_2$H$_n$, MoLi$_3$N$_2$H$_n$, TcLi$_3$N$_2$H$_n$, RuLi$_3$N$_2$H$_n$, RhLi$_3$N$_2$H$_n$, PdLi$_3$N$_2$H$_n$, AgLi$_3$N$_2$H$_n$, CdLi$_3$N$_2$H$_n$, AlLi$_3$N$_2$H$_n$, GaLi$_3$N$_2$H$_n$, GeLi$_3$N$_2$H$_n$, InLi$_3$N$_2$H$_n$, SnLi$_3$N$_2$H$_n$, and SbLi$_3$N$_2$H, (here n is an integer having a value of 1-6) as solid hydrides for the storage of hydrogen. These materials offer utility for hydrogen storage systems.

3 Claims, 1 Drawing Sheet

- ● - Nitrogen
- ◐ - Iron
- ○ - Lithium

- ● - Nitrogen
- ◐ - Iron
- ○ - Lithium
- • - Hydrogen

XLI$_3$N$_2$ COMPOUNDS AND THEIR HYDRIDES AS HYDROGEN STORAGE MATERIALS

TECHNICAL FIELD

This invention pertains to compounds useful for solid-state storage of hydrogen. More specifically, this invention pertains to a family of new compounds, XLi$_3$N$_2$, which form hydrides, XLi$_3$N$_2$H$_n$, where X is a 4d transition metal or a neighboring element in the periodic table.

BACKGROUND OF THE INVENTION

Considerable development effort is currently being expended on the development of hydrogen and oxygen consuming fuel cells, and there is also interest in hydrogen burning engines. Such power systems require means for storage of hydrogen fuel which hold hydrogen in a safe form at ambient conditions and which are capable of quickly receiving and releasing hydrogen. In the case of automotive vehicles, fuel storage is required to be on-board the vehicle, and storage of hydrogen gas at high pressure is generally not acceptable for such applications.

These requirements have led to the study and development of solid-state compounds for temporary storage of hydrogen, often as hydrides. For example, sodium alanate, NaAlH$_4$, can be heated to release hydrogen gas, and a mixture of lithium amide, LiNH$_2$, and lithium hydride, LiH, can be heated and reacted with the same effect. Despite such progress, however, no known solid-state system currently satisfies targets for on-board vehicular hydrogen storage.

U.S. patent application Ser. No. 11/386,409, titled "XLi$_3$N$_2$ Compounds and Their Hydrides as Hydrogen Storage Materials," by the inventor of this invention and assigned to the assignee of this invention, describes and claims a family of new compounds, XLi$_3$N$_2$, which form hydrides, XLi$_3$N$_2$H$_n$, where X is a 3d transition metal. This invention extends that family to certain additional XLi$_3$N$_2$ and XLi$_3$N$_2$H$_n$ compounds for hydrogen storage.

SUMMARY OF THE INVENTION

FeLi$_3$N$_2$ is prepared by reaction of Li$_3$N melt with elemental iron in a nitrogen atmosphere. It crystallizes in the body-centered Ibam structure (space group 72). Ternary compounds BLi$_3$N$_2$, AlLi$_3$N$_2$, and GaLi$_3$N$_2$ are also known to exist. However, other compounds like XLi$_3$N$_2$, where X is any of the 4d transition elements (Y—Cd), and neighboring elements, Ge, In, Sn, and Sb, are unknown. These other ternary nitride compounds would have the same stoichiometry as FeLi$_3$N$_2$ and are of interest as hydrogen storage materials where the ternary nitride takes up hydrogen as XLi$_3$N$_2$H$_n$.

State-of-the-art computational electronic structure methods, using FeLi$_3$N$_2$ as the template compound, indicate that several of these ternary nitrides, XLi$_3$N$_2$, are thermodynamically stable. Accordingly, this invention demonstrates the credible likelihood that each of YLi$_3$N$_2$, ZrLi$_3$N$_2$, NbLi$_3$N$_2$, MoLi$_3$N$_2$, TcLi$_3$N$_2$, RuLi$_3$N$_2$, RhLi$_3$N$_2$, GeLi$_3$N$_2$, InLi$_3$N$_2$, and SnLi$_3$N$_2$ can be prepared as new materials for storage of hydrogen. The computational methods also show thermodynamic stability of the hydrides YLi$_3$N$_2$H$_n$, ZrLi$_3$N$_2$H$_n$, NbLi$_3$N$_2$H$_n$, MoLi$_3$N$_2$H$_n$, TcLi$_3$N$_2$H$_n$, RuLi$_3$N$_2$H$_n$, RhLi$_3$N$_2$H$_n$, PdLi$_3$N$_2$H$_n$, AgLi$_3$N$_2$H$_n$, CdLi$_3$N$_2$H$_n$, AlLi$_3$N$_2$H$_n$, GaLi$_3$N$_2$H$_n$, GeLi$_3$N$_2$H$_n$, InLi$_3$N$_2$H$_n$, SnLi$_3$N$_2$H$_n$, and SbLi$_3$N$_2$H$_n$, where n is an integer having a value of 1-6. Accordingly, this invention also provides the likelihood of a hydrogen storage compound for each of the specified ternary nitride compositional formulas.

In some instances, hydrogen may be released from the hydride, XLi$_3$N$_2$H$_n$ to form the corresponding parent compound, XLi$_3$N$_2$. In other instances, release of hydrogen from the hydride also yields other chemical species containing the original metal, lithium and nitrogen.

DESCRIPTION OF PREFERRED EMBODIMENTS

State-of-the-art computational electronic structure methods implementing density functional theory (DFT) have been employed with substantial success to model hydride properties, including the crucial enthalpies of formation. That success encourages the development of strategies for harnessing the calculational tools to guide the discovery of novel hydrides. The approach in this case is to choose a compound having a known crystal structure and calculate enthalpies of formation for isostructural, hypothetical compounds constructed by elemental replacements and the addition of hydrogen to the original lattice.

In this work FeLi$_3$N$_2$ is selected as the template compound, and the formation of isostructural XLi$_3$N$_2$ phases and their XLi$_3$N$_2$H$_n$ hydrides with X any of the 4d transition elements (Y—Cd) and neighboring elements Al, Ga, Ge, In, Sn, and Sb is considered. Searching for hydrides comprising a 4d element such as Y or Zr to facilitate H$_2$ dissociation and lighter elements such as Li to enhance the gravimetric hydrogen density is the strategy.

AlLi$_3$N$_2$, and GaLi$_3$N$_2$ both crystallize in the body-centered cubic Ia3 structure (space group No. 206). BLi$_3$N$_2$ forms in at least three structures all distinct from Ibam: (i) a tetragonal P4$_2$2$_1$2 low-temperature phase, (ii) a monoclinic P2$_1$/c phase often observed at high temperatures, and (iii) a recently identified body-centered tetragonal I4$_1$/amd phase. A hydride of BLi$_4$N$_3$H$_{10}$ stoichiometry has been discovered. Other hydrides have been tentatively identified in the B-Li-N-H system.

Crystal Structure of FeLiN$_2$

Figure 1:
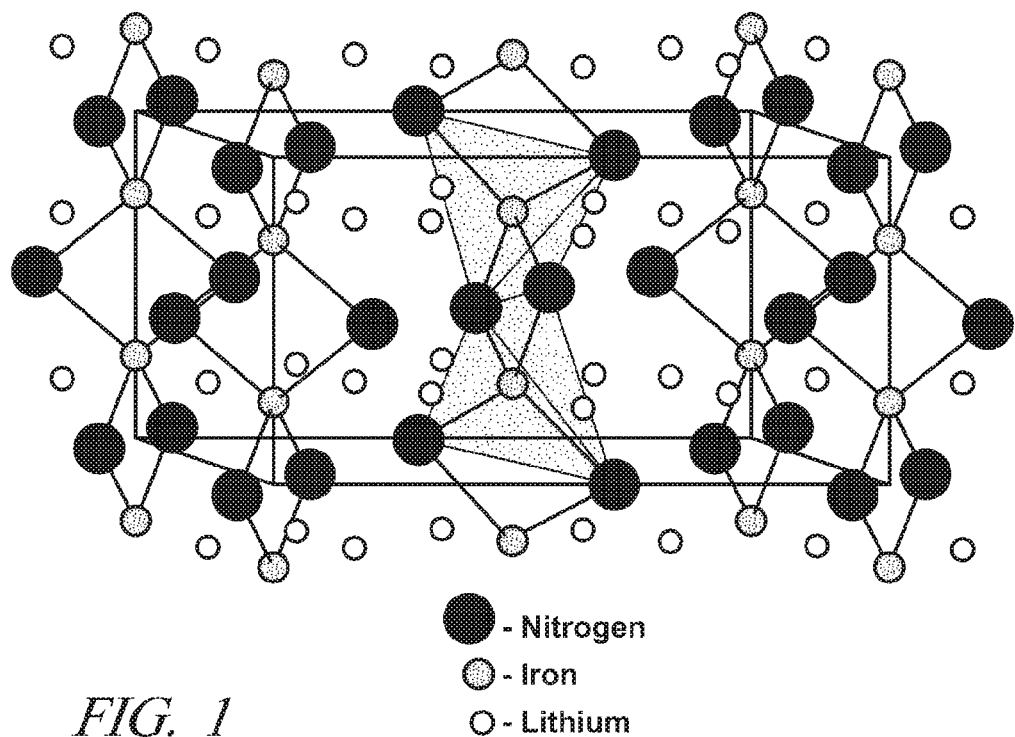
FIG. 1 illustrates the experimentally determined structure of FeLi$_3$N$_2$ that is the template for computational electronic structure methods showing the thermodynamic stability of other isostructural ternary nitride compounds, XLi$_3$N$_2$. In this figure, the large dark-filled circles represent the positions of nitrogen atoms, the speckled circles represent the positions of iron atoms, and the small unfilled circles represent positions of lithium atoms.
Figure 2:
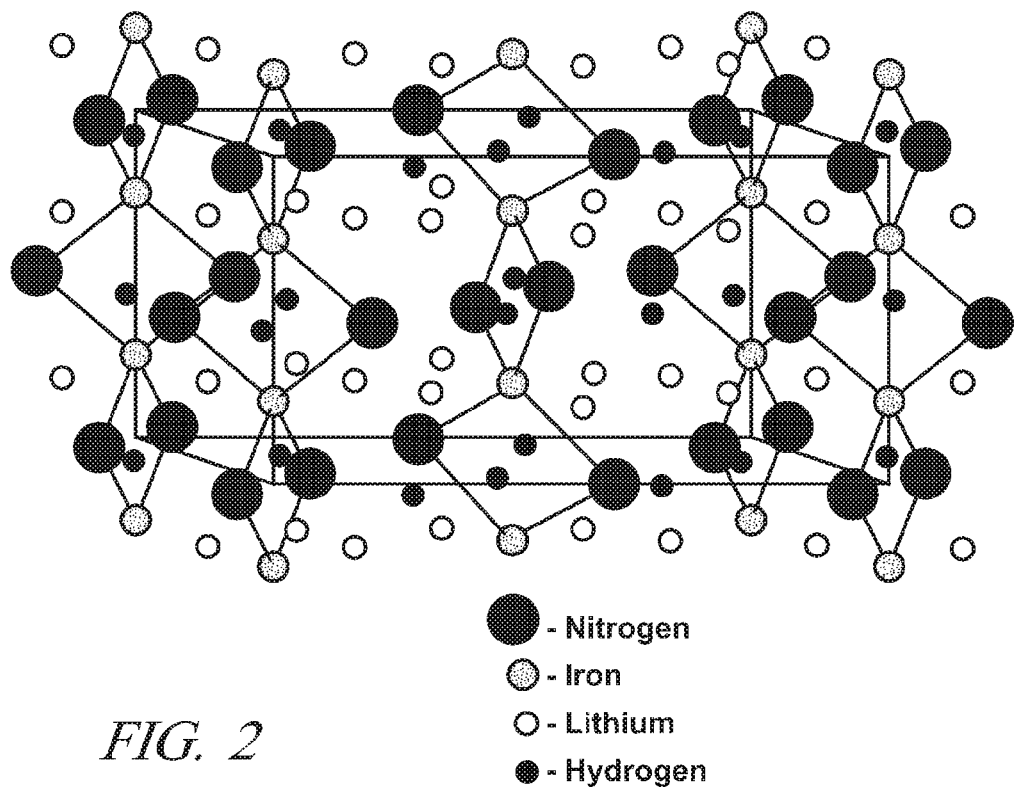
FIG. 2 illustrates the calculated structure of FeLi$_3$N$_2$H$_2$ with H atoms occupying the 8j sites in the Ibam structure; it is the most thermodynamically stable hydride of FeLi$_3$N$_2$ identified with the computational methodology used here. In this figure, the large dark filled circles represent the positions of nitrogen atoms, the speckled circles represent the positions of iron atoms, the small unfilled circles represent positions of lithium atoms, and the small dark filled circles represent positions of hydrogen atoms.

FeLi$_3$N$_2$ crystallizes in the body-centered orthorhombic Ibam structure (space group No. 72). The conventional unit cell, illustrated in FIG. 1, contains four FeLi$_3$N$_2$ formula units (f.u.). The space group allows eleven distinct crystallographic sites; the 4a, 4b, 4c, 4d, and 8e positions are fixed by symmetry, while the 8f, 8g, 8h, 8i, 8j, and 16k sites have variable coordinates and thus can be multiply occupied. In FeLi$_3$N$_2$, iron and nitrogen ions occupy the 4a and 8j sites, respectively, and the lithium ions fill the 4b and 8g sites. FeLi$_3$N$_2$ contains infinite chains of edge-sharing FeN$_4$ tetrahedra along the c-direction. These chains are isoelectronic to the SiS$_2$ one-dimensional macromolecule and form nearly hexagonal arrays linked by sharing common edges with LiN$_4$ tetrahedra. Two of these tetrahedra are highlighted with speckling in FIG. 1.

Calculation Procedures

Electronic total energies E were computed for the primitive cells (containing two formula units, f.u.) with the Vienna ab initio simulation package (VASP), which implements DFT using a plane wave basis set. Projector-augmented wave potentials were employed for the elemental constituents, and a generalized gradient approximation (GGA) was used for the exchange-correlation energy functional $\mu_{xc}$. Non-magnetic calculations were performed for all materials. In addition, spin-polarized calculations were done for some of the Pd-containing compounds to assess the possibility of magnetic states. An interpolation formula was used for the correlation component of $\mu_{xc}$ in the spin-polarized cases. For all the XLi$_3$N$_2$ and XLi$_3$N$_2$H$_n$ compounds a plane wave cutoff energy of 900 eV was imposed and (6 6 6) Monkhorst-type k-point grids having 45 points in the irreducible Brillouin zone were employed. In each case at least two simultaneous relaxations of the lattice constants and nuclear coordinates not fixed by the space group were carried out. The electronic total energies and forces were converged to 10$^{-6}$ eV/cell and 10$^{-4}$ eV/Å, respectively. Calculations for the H$_2$, N$_2$ molecules and the elemental metals Li, X were performed with the same computational machinery to the same levels of precision.

Enthalpies of formation, ΔH, were obtained from total energy differences:

$$\Delta H(XLi_3N_2) = E(XLi_3N_2) - E(X) - 3E(Li) - E(N_2) \quad (1)$$

for the parent compounds, and $$\Delta H(XLi_3N_2H_n) = (2/n)[E(XLi_3N_2H_n) - E(X) - 3E(Li) - E(N_2) - (n/2)E(H_2)] \quad (2)$$

for the hydrides, where n is the number of H atoms in a given configuration. Each ΔH, specified per XLi$_3$N$_2$ formula unit (f.u.) in equation (1) and per H$_2$ molecule in equation (2), is the standard enthalpy of formation at zero temperature in the absence of zero point energy contributions. A negative ΔH indicates stability of the material relative to its elemental solid and molecular constituents.

Results of Calculations

XLi$_3$N$_2$ Parent Compounds

Table I lists ΔH(XLi$_3$N$_2$) values calculated according to equation (1) for X=Y, Zr, Nb, Mo, Tc, Ru, Rh, Pd, Ag, Cd, Al, Ga, Ge, In, Sn, and Sb.

TABLE I

| Compound | ΔH(XLi$_3$N$_2$) (kJ/mole f.u.) |
| --- | --- |
| YLi$_3$N$_2$ | −330 |
| ZrLi$_3$N$_2$ | −337 |
| NbLi$_3$N$_2$ | −267 |
| MoLi$_3$N$_2$ | −230 |
| TcLi$_3$N$_2$ | −200 |
| RuLi$_3$N$_2$ | −137 |
| RhLi$_3$N$_2$ | −95 |
| PdLi$_3$N$_2$ | +20 |
| AgLi$_3$N$_2$ | +127 |
| CdLi$_3$N$_2$ | +15 |
| AlLi$_3$N$_2$ | −482 (−510) |

TABLE I-continued

| Compound | ΔH(XLi$_3$N$_2$) (kJ/mole f.u.) |
| --- | --- |
| GaLi$_3$N$_2$ | −285 (−317) |
| GeLi$_3$N$_2$ | −68 |
| InLi$_3$N$_2$ | −122 |
| SnLi$_3$N$_2$ | −11 |
| SbLi$_3$N$_2$ | +76 |

Except for PdLi$_3$N$_2$, AgLi$_3$N$_2$, CdLi$_3$N$_2$, and SbLi$_3$N$_2$, ΔH is negative suggesting that all the other XLi$_3$N$_2$ compounds form. This is certainly correct for AlLi$_3$N$_2$ and GaLi$_3$N$_2$, which are known to exist, but in the cubic Ia3 structure. ΔH calculated for those compounds in the cubic structure is given in parentheses in Table I. These two cases underscore the likely possibility that the actual space group characterizing the other XLi$_3$N$_2$ materials in Table I having ΔH<0 may well differ from the Ibam FeLi$_3$N$_2$ template on which the calculations are based. In that circumstance the ΔH entry in Table I sets an upper bound on the enthalpy of formation; for AlLi$_3$N$_2$ and GaLi$_3$N$_2$ it is clear that ΔH for the actual cubic structure is more negative than that calculated assuming the Tbam space group. It is also possible that PdLi$_3$N$_2$ and CdLi$_3$N$_2$, for which ΔH is positive but relatively small in Table I, form a structure other than Ibam having ΔH<0. That possibility is more distant for AgLi$_3$N$_2$ and SbLi$_3$N$_2$ since ΔH for each of those compounds is substantially more positive. Spin-polarized calculations for PdLi$_3$N$_2$ yielded a negligible magnetic moment and a total energy identical to that from the non-magnetic calculation.

Plots of the electronic density of states (DoS) were calculated for each XLi$_3$N$_2$ compound. The DoS is zero at the Fermi level $\epsilon_F$ with an energy gap separating the highest occupied and lowest empty states for YLi$_3$N$_2$, AlLi$_3$N$_2$, GaLi$_3$N$_2$, and InLi$_3$N$_2$, indicating that those materials are insulators. All the other compounds have a non-zero DoS at $\epsilon_F$ and are thus metals.

XLi$_3$N$_2$H$_n$ Hydrides

Since the fixed-coordinate 4a and 4b sites in the Ibam structure are occupied by X and Li, respectively, the 4c, 4d, 8e, 8f, 8g, 8h, 8i, 8j, and 16k sites, and combinations of them, are available for occupation by hydrogen. All these sites other than the 4c, 4d, and 8c can be multiply occupied, so that in principle an infinite number of hydrogen configurations are possible. For each element X calculations of ΔH(XLi$_3$N$_2$H$_n$) as defined by Equation (2) were performed to assess whether stable [ΔH(XLi$_3$N$_2$H$_n$)<0] hydride configurations exist and to find the most stable configuration, that for which ΔH(XLi$_3$N$_2$H$_n$) is a minimum. According to the van't Hoff relation $$\ln p/p_0 = \Delta H/RT - \Delta S/R, \quad (3)$$

where ΔS is the entropy of formation and R the gas constant, the configuration having the most negative ΔH is that which is stable at the lowest H$_2$ pressure p.

Calculations were carried out for hydrogen filling of the 4c, 4d, 8e, 8j, and 16k individual sites and for the 4d8j, 8j$_1$8j$_2$, 4d8j$_1$8j$_2$, 4d16k, 8j16k, and 16k$_1$16k$_2$ combinations. Each of these configurations yielded ΔH<0 for at least some elements X in the 3d transition metals, and the set of choices is likely sufficiently comprehensive to ensure that the configuration having the minimum ΔH is identified for each XLi$_3$N$_2$H$_n$. The results are compiled in Table II.

There are several negative ΔH values for every X, suggesting the possibility of hydride formation in each case. The minimum ΔH for a given XLi$_3$N$_2$H$_n$ is highlighted in bold. None of these hydrides is known to exist.

TABLE II $\Delta H(XLi_3N_2H_n)$ (kJ/mole $H_2$)

X

| H sites | Y | Zr | Nb | Mo | Tc | Ru | Rh | Pd | Ag | Cd | Al | Ga | Ge | In | Sn | Sb |
|---|---|---|---|---|---|---|---|---|---|---|---|---|---|---|---|---|
| 4c | 273 | 204 | 367 | 535 | 611 | 618 | 545 | 568 | 667 | 573 | 115 | 416 | 697 | 709 | 824 | 861 |
| 4d | −352 | −324 | −129 | 16 | 47 | 125 | 179 | 212 | 268 | 16 | −277 | 116 | 237 | 159 | 223 | 296 |
| 8e | −7 | −64 | −94 | −21 | 29 | 136 | 249 | 386 | 562 | 521 | −7 | 180 | 75 | 375 | 248 | 225 |
| 8j | −281 | −258 | −161 | −74 | −105 | −39 | −65 | −110 | −147 | −101 | −86 | −101 | −38 | −71 | −34 | −20 |
| 16k | −51 | −36 | −12 | −2 | −20 | −43 | −94 | −136 | −144 | −151 | 127 | −151 | −151 | −144 | −147 | −160 |
| 4d8j | −207 | −151 | −65 | −7 | 58 | 78 | 26 | 35 | 36 | 21 | −197 | 47 | 95 | 50 | −63 | 52 |
| $8j_18j_2$ | −223 | −202 | −151 | −115 | −88 | −65 | −58 | −19 | 42 | −29 | −273 | −175 | −66 | −106 | −43 | 5 |
| $4d8j_18j_2$ | −127 | −93 | −45 | −13 | −12 | −2 | −18 | −31 | 15 | −49 | −86 | −27 | 10 | −17 | 3 | 5 |
| 4d16k | −15 | 14 | 51 | 76 | 67 | 48 | −1 | −49 | −76 | −97 | −55 | −77 | −59 | −84 | −77 | −76 |
| 8j16k | −98 | −87 | −65 | −51 | −61 | −78 | −113 | −140 | −119 | −72 | −73 | −72 | −70 | −79 | −69 | −65 |
| $16k_116k_2$ | −33 | −36 | −34 | −35 | −53 | −61 | −73 | −65 | −42 | −24 | −53 | −43 | −40 | −25 | −30 | −31 |

It is clear from Table II that the most stable hydrogen configuration varies with X. The 4d sites provide the greatest stability (i.e., most negative ΔH per mole $H_2$) for X=Y, Zr, Al; the 8j sites for Nb, Tc, Ag; the 16k sites for Cd, Ge, In, Sn, Sb; the $8j_18j_2$ combination for Mo, Ga; and the 8j16k configuration for Ru, Rh, Pd. Spin-polarized calculations for the $PdLi_3N_2H_6$ (8j16k) hydride (occupied hydrogen sites in parentheses) produced an insignificant magnetic moment and a total energy identical to the non-magnetic result. $RuLi_3N_2H_6$ (8j16k), $RhLi_3N_2H_6$ (8j16k), and $PdLi_3N_2H_6$ (8j16k) contain the most hydrogen atoms per formula unit of all the hydrides featuring minimum ΔH.

The most stable hydride configuration for X=Y, Zr, Mo, Tc, Ag, and Cd is the same as that for the cognate 3d elements (i.e., those one row above in the periodic table) As specific examples, the 4d hydrogen sites lead to the greatest stability in $YLi_3N_2H$ and $ScLi_3N_2H$, as do the $8j_18j_2$ sites in both $MoLi_3N_2H_4$ and $CrLi_3N_2H_4$. In contrast, $NbLi_3N_2$ (8j), $RuLi_3N_2H_6$ (8j16k), $RhLi_3N_2H_6$ (8j16k), and $PdLi_3N_2H_6$ (8j16k) are found to be most stable here, while their 3d analogs are $VLi_3N_2H_4$ ($8j_18j_2$), $FeLi_3N_2H_2$ (8j), $CoLi_3N_2H_2$ (8j), and $NiLi_3N_2H_2$ (8j), respectively.

Table III summarizes the minimum ΔH results from Table II and includes the hydrogen mass percentage for each hypothetical hydride.

TABLE III

| $XLi_3N_2H_n$ hydride (H configuration in conventional cell) | $\Delta H(XLi_3N_2H_n)$ (kJ/mole $H_2$) | $\Delta H^*(XLi_3N_2H_n)$ (kJ/mole $H_2$) | mass % H |
|---|---|---|---|
| $YLi_3N_2H$ (4d) | −352 | +308 | 0.7 |
| $ZrLi_3N_2H$ (4d) | −324 | +350 | 0.7 |
| $NbLi_3N_2H_2$ (8j) | −161 | +106 | 1.4 |
| $MoLi_3N_2H_4$ ($8j_18j_2$) | −115 | −0.2 | 2.7 |
| $TcLi_3N_2H_2$ (8j) | −105 | +95 | 1.4 |
| $RuLi_3N_2H_6$ (8j16k) | −78 | −32 | 3.9 |
| $RhLi_3N_2H_6$ (8j16k) | −113 | −81 | 3.8 |
| $PdLi_3N_2H_6$ (8j16k) | −140 | −147 | 3.7 |
| $AgLi_3N_2H_2$ (8j) | −147 | −274 | 1.3 |
| $CdLi_3N_2H_4$ (16k) | −151 | −158 | 2.4 |
| $AlLi_3N_2H$ (4d) | −277 | +743 | 1.3 |
| $GaLi_3N_2H_4$ ($8j_18j_2$) | −175 | −17 | 3.3 |
| $GeLi_3N_2H_4$ (16k) | −151 | −117 | 3.2 |
| $InLi_3N_2H_4$ (16k) | −144 | −83 | 2.4 |
| $SnLi_3N_2H_4$ (16k) | −147 | −142 | 2.3 |
| $SbLi_3N_2H_4$ (16k) | −160 | −198 | 2.3 |

If any of these were to form in a different crystal structure, or with an alternate stoichiometry, the hydrogen content could certainly change.

The formation enthalpy for the hydride with respect to its parent compound, $$\Delta H^*(XLi_3N_2H_n) \equiv (2/n)[E_{el}(XLi_3N_2H_n) - E_{el}(XLi_3N_2) - (n/2)E_{el}(H_2)], \quad (4)$$

is also given in Table III. For $MoLi_3N_2H_4$ ($8j_18j_2$), $RuLi_3N_2H_6$ (8j16k), $RhLi_3N_2H_6$ (8j16k), $GaLi_3N_2H_4$ ($8j_18j_2$), $GeLi_3N_2H_4$ (16k), $InLi_3N_2H_4$ (16k), and $SnLi_3N_2H_4$ (16k), $\Delta H^*(XLi_3N_2H_n)$ and $\Delta H(XLi_3N_2)$ in Table I are both negative. That is, the hydride is stable with respect to a stable parent, suggesting the possibility of cycling between the two, a situation much more desirable from an applications perspective than cycling between the $XLi_3N_2H_n$ hydride and its four elemental constituents (X and Li metals, $H_2$ and $N_2$ gases). It is also significant to observe that for all the stable parents in Table I there are $XLi_3N_2H$, hydrides for which $\Delta H^*(XLi_3N_2H_n)$ is negative, including X=Y. Zr, Nb, Tc, and Al in Table III for which the hydride entry there is characterized by $\Delta H^*>0$.

To illustrate the effect of hydriding on the electronic structure, the DoS for the hydrides characterized by the minimum ΔH (Table III) were calculated. For most of the hydrides hydrogen-derived bands appear below the bottom of the valence bands of the parent, similar to the behavior of $LaNi_5$ on hydriding. From the DoS at the Fermi energy $\epsilon_F$ it was apparent that the $YLi_3N_2H$ (4d), $ZrLi_3N_2H$ (4d), $NbLi_3N_2H_2$ (8j), $MoLi_3N_2H_4$ ($8j_18j_2$), $RuLi_3N_2H_6$ (8j16k), $RhLi_3N_2H_6$ (8j16k), $PdLi_3N_2H_6$ (8j16k), $CdLi_3N_2H_4$ (16k) and $AlLi_3N_2H$ (4d), $GeLi_3N_2H_4$ (16k), $InLi_3N_2H_4$ (16k), $SnLi_3N_2H_4$ (16k) and $SbLi_3N_2H_4$ (16k) hydrides are metals. $TcLi_3N_2H_2$ (8j), $AgLi_3N_2H_2$ (8j), and $GaLi_3N_2H_4$ ($8j_18j_2$) are all insulators (zero DoS and gaps at $\epsilon_F$).

Most of the $XLi_3N_2$ parent compounds are metals and remain metallic on hydrogen uptake. While $TcLi_3N_2$ and $AgLi_3N_2$ are metals, their hydrides are insulators. On the other hand, $YLi_3N_2$, $AlLi_3N_2$, and $InLi_3N_2$ are insulating, but their hydrides are predicted to be metallic. Were these materials to form, such metal ↔ insulator transitions might be exploited for hydrogen sensor applications.

These state-of-the-art electronic structure calculations demonstrate the likelihood of the availability of $YLi_3N_2$, $ZrLi_3N_2$, $NbLi_3N_2$, $MoLi_3N_2$, $TcLi_3N_2$, $RuLi_3N_2$, $RhLi_3N_2$, $GeLi_3N_2$, $InLi_3N_2$, and $SnLi_3N_2$. These parent compounds feature large, negative enthalpies of formation as illustrated in Table I. It is also important to observe that the absence of a stable parent compound, as may be the case for X=Pd, Ag, Cd, and Sb in Table I, does not necessarily preclude the existence of a corresponding hydride. Many such systems are known, among them $NaAlH_4$ and $Mg_2FeH_6$, whose antecedents NaAl and $Mg_2Fe$ do not form.

The electronic structure calculations also indicate that all considered hydrides have substantial negative enthalpies of formation as illustrated in Tables II and III. These hydrides include $YLi_3N_2H_n$, $ZrLi_3N_2H_n$, $NbLi_3N_2H_n$, $MoLi_3N_2H_n$, $TcLi_3N_2H_n$, $RuLi_3N_2H_n$, $RhLi_3N_2H_n$, $PdLi_3N_2H_n$, $AgLi_3N_2H_n$, $CdLi_3N_2H_n$, $AlLi_3N_2H_n$, $GaLi_3N_2H_n$, $GeLi_3N_2H_n$, $InLi_3N_2H_n$, $SnLi_3N_2H_n$, and $SbLi_3N_2H_n$. Here n is an integer in the range of 1-6.

It is also noted (as illustrated in Table III) that the hydrides $MoLi_3N_2H_4$ ($8j_18j_2$), $RuLi_3N_2H_6$ (8j16k), $RhLi_3N_2H_6$ (8j16k), $GaLi_3N_2H_4$ ($8j_18j_2$), $GeLi_3N_2H_4$ (16k), $InLi_3N_2H_4$ (16k), and $SnLi_3N_2H_4$ (16k) are characterized by minimum $\Delta H$ with respect to the elemental constituents as well as negative values of $\Delta H^*$ with respect to the parent materials. The electronic structure calculations indicate that these hydrides are thermodynamically stable with respect to their respective stable parent compounds (i.e., those having $\Delta H<0$ in Table I). This relationship suggests that hydrogen may be cyclically absorbed and released using these hydrides and their parent compounds.

The above described synthesis of $FeLi_3N_2$, adapted for the properties of the specific properties of the elements of the 4d transition metal group and of germanium, indium, and tin, provides a basis for the synthesis of the above listed parent compounds. The hydrides might be prepared by reacting appropriate amounts of $LiNH_2$, LiH, and the elemental metals X, or similar schemes with the XN nitrides and $Li_3N$.

The invention claimed is:

1. Any one or more of the ternary nitrides of the compositional formulas selected from the group consisting of $YLi_3N_2$, $ZrLi_3N_2$, $NbLi_3N_2$, $MoLi_3N_2$, $TcLi_3N_2$, $RuLi_3N_2$, $RhLi_3N_2$, $GeLi_3N_2$, and $SnLi_3N_2$.

2. Any one or more of the hydrides of ternary nitrides of the compositional formulas selected from the group consisting of $YLi_3N_2H_n$, $ZrLi_3N_2H_n$, $NbLi_3N_2H_n$, $MoLi_3N_2H_n$, $TcLi_3N_2H_n$, $RuLi_3N_2H_n$, $RhLi_3N_2H_n$, $PdLi_3N_2H_n$, $AgLi_3N_2H_n$, $CdLi_3N_2H_n$, $AlLi_3N_2H_n$, $GaLi_3N_2H_n$, $GeLi_3N_2H_n$, $InLi_3N_2H_n$, $SnLi_3N_2H_n$, and $SbLi_3N_2H_n$, where n is an integer having a value of from 1-6.

3. Any one or more of the hydrides as recited in claim 2 of the compositional formulas selected from the group consisting of $YLi_3N_2H$, $ZrLi_3N_2H$, $NbLi_3N_2H_2$, $MoLi_3N_2H_4$, $TcLi_3N_2H_2$, $RuLi_3N_2H_6$, $RhLi_3N_2H_6$, $PdLi_3N_2H_6$, $AgLi_3N_2H_2$, $CdLi_3N_2H_4$, $AlLi_3N_2H$, $GaLi_3N_2H_4$, $GeLi_3N_2H_4$, $InLi_3N_2H_4$, $SnLi_3N_2H_4$, and $SbLi_3N_2H_4$.

* * * * *